US011354905B1

(12) United States Patent
Chen et al.

(10) Patent No.: US 11,354,905 B1
(45) Date of Patent: Jun. 7, 2022

(54) LEVERAGING COMPUTER VISION AND MACHINE LEARNING TO IDENTIFY COMPELLING SCENES

(71) Applicant: Amazon Technologies, Inc., Seattle, WA (US)

(72) Inventors: Kewen Chen, King, WA (US); Tu Anh Ho, Mercer Island, WA (US); Muhammad Raffay Hamid, Seattle, WA (US); Shixing Chen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/247,324

(22) Filed: Dec. 7, 2020

(51) Int. Cl.
*G06V 20/40* (2022.01)
*G06V 40/16* (2022.01)

(52) U.S. Cl.
CPC .............. *G06V 20/46* (2022.01); *G06V 20/49* (2022.01); *G06V 40/165* (2022.01); *G06V 40/168* (2022.01)

(58) Field of Classification Search
CPC ...... G06V 20/46; G06V 20/49; G06V 40/165; G06V 40/168
See application file for complete search history.

(56) References Cited

U.S. PATENT DOCUMENTS

| 8,503,523 B2* | 8/2013 | Williams | H04N 21/23418 375/240.09 |
| 8,995,823 B2* | 3/2015 | O'Kelly | G11B 27/28 386/239 |
| 9,378,423 B2* | 6/2016 | Neumann | G10L 15/22 |
| 10,062,412 B2* | 8/2018 | Liu | G11B 27/28 |

OTHER PUBLICATIONS

Florian Schroff, et al., "Facenet: A unified embedding for face recognition and clustering." In Proceedings of the IEEE conference on computer vision and pattern recognition, pp. 815-823, 2015.
Rasmus Rothe, et al.,"Dex: Deep expectation of apparent age from a single image." In Proceedings of the IEEE international conference on computer vision workshops,pp. 10-15, 2015.
Feifei Zhang, et al., "Joint pose and expression modeling for facial expression recognition." In Proceedings of the IEEE conference on computer vision and pattern recognition, pp. 3359-3368, 2018.
Itur BS. "Algorithms to measure audio programme loudness and true-peak audio level." International Telecommunication Union, Tech. Rep, 4:1770, 2015.

* cited by examiner

*Primary Examiner* — Phuoc Tran
(74) *Attorney, Agent, or Firm* — Weaver Austin Villeneuve & Sampson LLP (57) ABSTRACT

Methods and apparatus are described for generating compelling preview clips of media presentations. Compelling clips are identified based on the extent to which human faces are shown and/or the loudness of the audio associated with the clips. One or more of these compelling clips are then provided to a client device for playback.

20 Claims, 6 Drawing Sheets

LEVERAGING COMPUTER VISION AND MACHINE LEARNING TO IDENTIFY COMPELLING SCENES

BACKGROUND

Users have an ever-increasing array of options for consuming media presentation, in terms of the types of media presentation (e.g., video, audio, etc.), providers of the media presentation, and devices for consuming the media presentation. Media presentation providers are becoming increasingly sophisticated and effective at providing media presentation quickly and reliably to users.

Given the wide variety of available content, users may find it difficult to decide what to watch. Providing a short but compelling preview of media presentation may help users make an informed decision about what to watch. Unfortunately, the content in a preview may not be tailored to a specific customer's preferences and so may not adequately support such decision making. Furthermore, it is difficult to identify compelling clips of media presentation without time-intensive manual review and labeling.

DETAILED DESCRIPTION

This disclosure describes techniques for identifying clips of compelling scenes associated with a media presentation and providing such clips (e.g., as previews) based on user preferences or other characteristics. A "clip" is a sequence of successive frames of a media presentation that begin or end on a shot boundary. A "shot" is a sequence of successive frames of the media presentation that are visually similar (e.g., frames belonging to the same scene). Clips corresponding to compelling scenes are initially identified based on the extent to which the faces of characters are shown and/or the loudness of the clips. Character-themed clips featuring close-up views of the main characters can attract a user's attention, while louder clips often correspond to "high intensity" scenes that may also be engaging for users. As will be described, scene boundaries are also identified to reduce the likelihood that the identified clips don't start or end in the middle of a shot. A subset of the identified clips is then selected based on metrics that correlate with compelling content.

The selected clips are then used to provide personalized sequences as, for example, previews in an interface used by a viewer for media presentation selection. These personalized previews are intended to help users discover content they may be inclined to watch. For example, users may be provided with clips featuring characters or performers they prefer. Alternatively, or in addition, users may be provided with clips featuring "high intensity" scenes based on a loudness of the clip.

Figure 1:
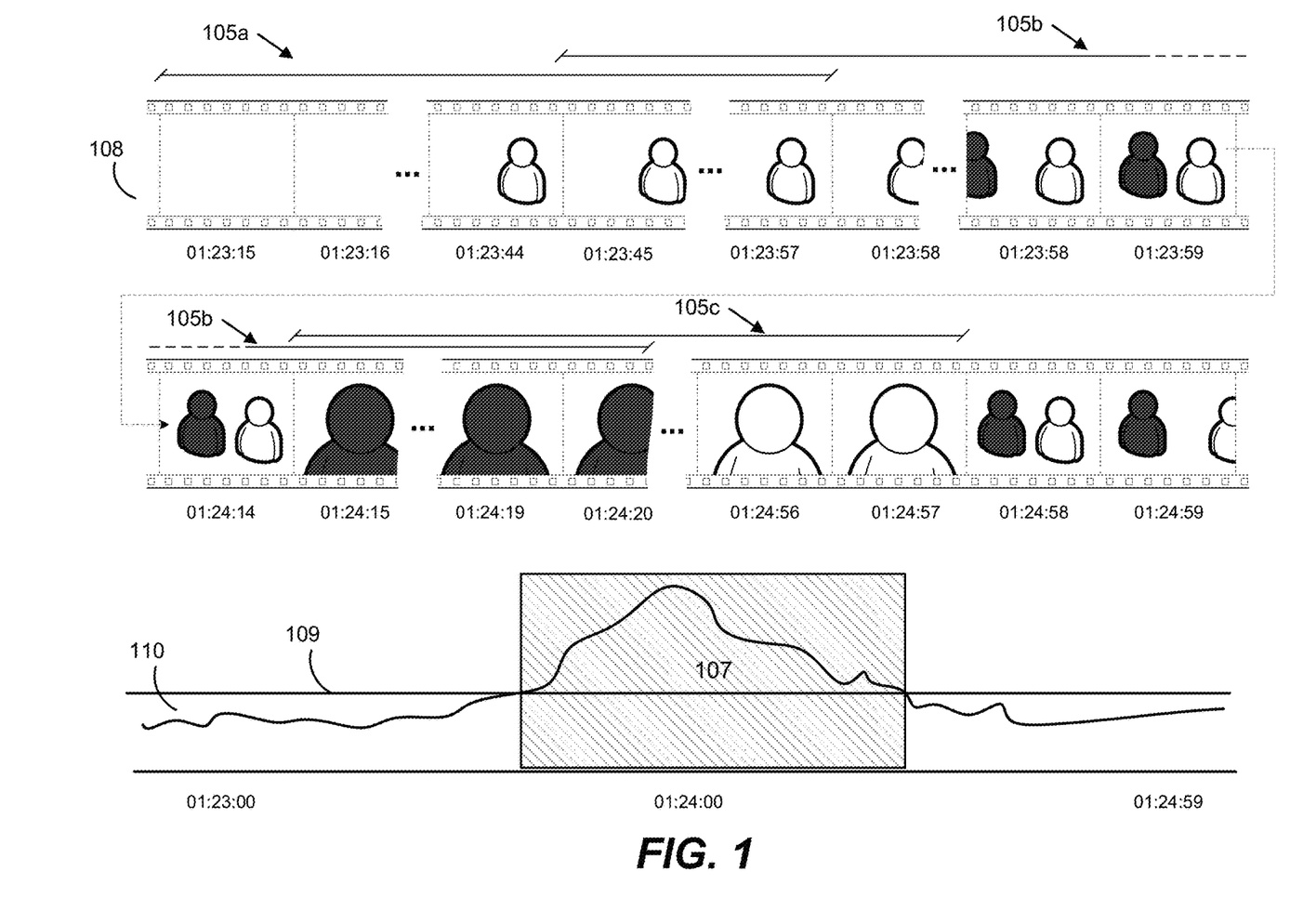
FIG. 1 illustrates an example of a particular class of implementations for identifying and selecting compelling preview clips.

FIG. 1 illustrates an example of providing personalized clips of a media presentation as enabled by the present disclosure. Frames 108 represent portions of a media presentation, which might be a movie or an episode of a show. For illustrative purposes, FIG. 1 shows the media presentation as including one frame per second. However, those of skill in the art will understand that this is being done for purposes of exposition, and that media content typically includes many more frames per second, e.g., about 30 or 60 frames per second. Graph 110 provides a graphical representation of the loudness of the audio associated with frames having time stamps between 1:23:00 and 1:24:59.

To identify compelling clips, clips 105a-c are initially identified from frames 108. The time stamps for clips 105a-c are illustrated via lines markers on frames 108 and via boxes on graph 110. Clip 105a extends from 1:23:15 to 1:23:57, clip 105b extends from 1:23:45 to 1:24:20, and clip 105c extends from 1:24:15 to 1:24:57. The manner in which these clips are identified is discussed in greater detail below. While only 3 clips are shown in FIG. 1, it should be understood that, typically, many more clips are identified across the entire media presentation. To identify compelling clips based on faces of characters, each of clips 105a-c is analyzed to determine the extent to which the faces of characters are shown and subsequently ranked. As illustrated in frames 108, frames of a clip 105c (extending from 1:24:15 to 1:24:57) have larger faces than the frames of clips 105a and 105b. Because clip 105c includes faces to a greater extent than clip 105a or clip 105b it receives a higher ranking. Based on that higher ranking, clip 105c may be identified as a compelling clip for the media presentation.

Another process may be employed to analyze and select clips based on loudness. For example, graph 110 represents a measure of the loudness of the media presentation over time. A loudness threshold 109 is used to identify clips that exceed the loudness threshold throughout the clip. As illustrated in graph 110, clip 107 is louder than loudness threshold 109 throughout the duration of clip 107. Thus, clip 107 may be identified as a compelling clip for the media presentation based on loudness.

Both types of compelling clips are then provided to a personalization engine. When a user is browsing a media service to find a media presentation to watch, the personalization engine selects one or more of the compelling clips based on preferences and/or characteristics of the user or user device and features of the compelling clips. The selected clip(s) are then provided to the user device for playback, e.g., as a preview.

Figure 2:
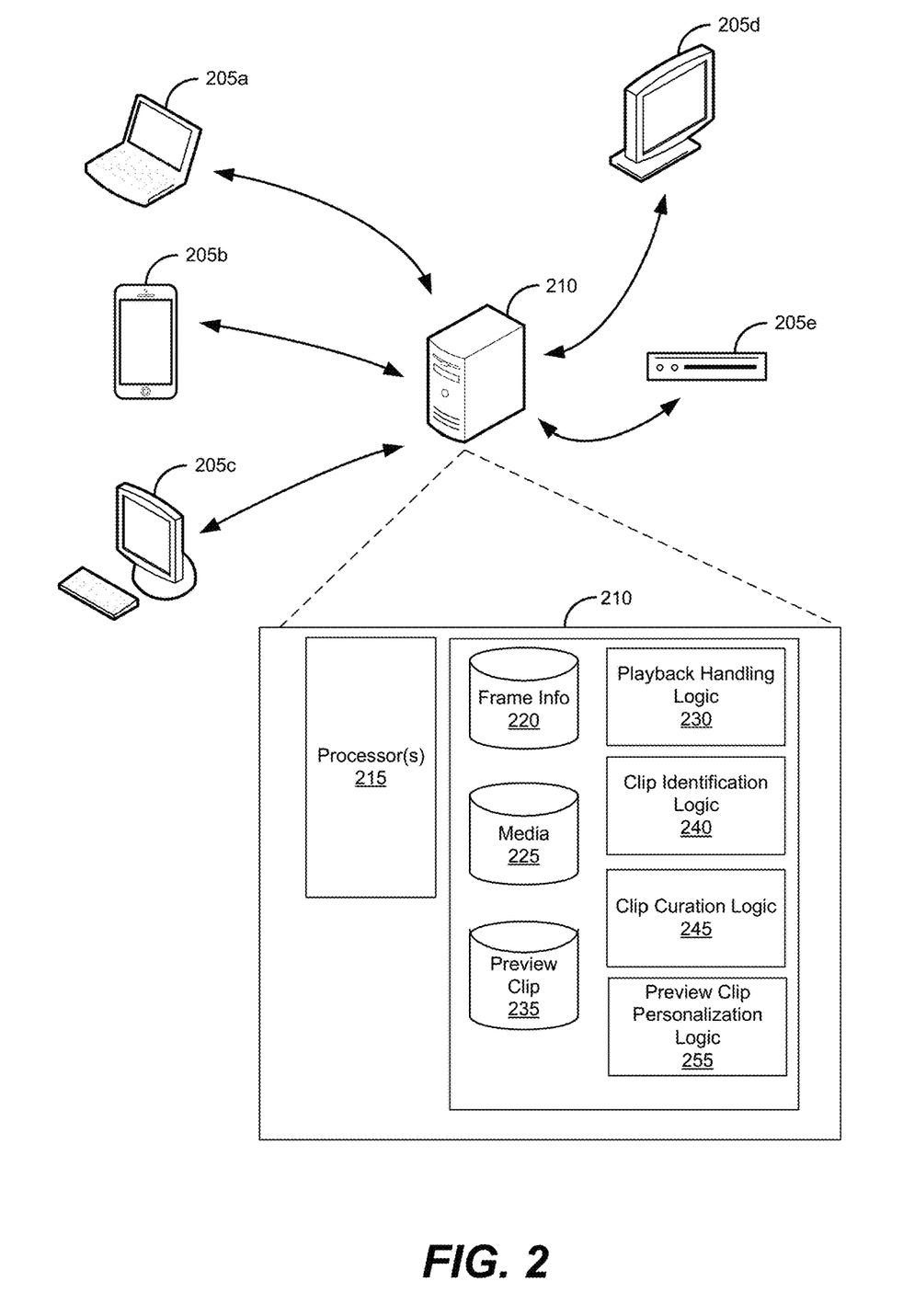
FIG. 2 illustrates an example of a computing environment in which implementations enabled by the present disclosure may be practiced.

FIG. 2 illustrates an example of a computing environment in which personalized preview clips may be generated and presented as enabled by the present disclosure. The computing environment of FIG. 2 includes media server 210 which can be used to provide a media presentation for playback on devices 205a-e.

It should be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media presentations herein is merely by way of example. Suitable alternatives known to those of skill in the art may be employed.

Media server 210 may be part of a content delivery system that conforms to any of a wide variety of architectures. The functionality and components of media server 210 can use one or more servers and be deployed at one or more geographic locations (e.g., across different countries, states, cities, etc.) using a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc.

Media server 210 can include various types of logic used to provide media presentations for playback at devices 205*a*-*e*. In FIG. 2, media server 210 includes media presentation storage 225, frame information 220, and preview clip information 235. Media server 210 also includes playback handling logic 230, preview clip identification logic 240, preview clip curation logic 245, and preview clip personalization logic 255.

Media presentation storage 225 stores a variety of media presentations for playback on devices 205*a*-*e*, such as episodes of television shows, movies, music, etc. Preview clip information 235 can be a storage mechanism, such as a database, storing metadata relating to preview clips corresponding to subsets of frames (i.e., still images in video) of television shows. For example, preview clips of every episode of a television show stored in media presentation storage 225 can be represented by an episode identifier, a start time, and an end time stored in preview clip information 235. In some implementations, each preview clip in preview clip information 235 may be associated with additional information, such as, for example, an importance ranking, relationship to other preview clips, relationship to a corresponding scene, a category (e.g., action, romance, etc.), a setting, included actors, closed-captioned data providing a transcript of the dialogue in the preview clip, script data providing production details, a plot arc identifier, user rankings or commentary, trivia, and so forth.

In certain implementations, at least some of the contents of preview clip information 235 may be generated automatically. For example, image processing of video frames to identify shot boundaries, changes in scenery, and/or characters depicted, audio processing to determine loudness and detect changes in music, ambient audio, and dialogue, and natural language processing of textual data in the script or available subtitles to perform content and sentiment analysis, may each contribute to both selecting preview clips for a media presentation and associating metadata with the preview clips.

It should be appreciated that the techniques for generating personalized preview clip sequences as described herein are compatible with a wide variety of time frames for the generation of preview clip information 235. For example, for a television show having multiple seasons and episodes, personalized preview clip sequences can use preview clip information 235 that may have been generated months in advance, such as at the time of production of the television show episode.

Media server 210 also can include one or more processors 215, memory, and other hardware for performing the tasks disclosed herein. For example, playback handling logic 230 determines whether a request for a preview clip of a media presentation has been received from a viewer device, identifies the media presentation being requested, and retrieves user preferences associated with the viewer device. Playback handling logic 230 also performs tasks relating to generating and providing manifest data representing preview clips.

Preview clip identification logic 240 performs tasks relating to identifying clips from media presentations, identifying shot boundaries, ranking or selecting clips according to various metrics, and selecting clips to be used for personalized previews. Preview clip curation logic 245 performs tasks relating to reviewing selected clips for quality control purposes.

In some implementations, preview clip information 235, which stores metadata relating to preview clips, can also be used to store the preview clips themselves. For example, each preview clip may be stored as a data structure including fields corresponding to preview clip identifiers, start and stop time modifiers, and, in some implementations, viewer device or account identifiers.

Preview clip identification logic 240 and/or preview clip curation logic 245 can interface to preview clip personalization logic 255. Preview clip personalization logic 255 performs tasks related to analysis of preview clips and/or selecting preview clips to provide to a user. For example, in certain implementations, the selection of preview clips may be based on the relationship between the current playback history of a viewer device and a change in playback history for other viewer devices. For instance, a media server can lookup information relating to preview clips previously generated for other viewer devices. The lookup process can return a set of preview clips that were previously generated for a similar configuration of media presentation and device attributes. Each clip in the set may also have an associated field indicating whether the viewer device for which the clip was provided eventually watched the media presentation. Alternatively, the media server can retrieve the current playback history for viewer devices corresponding to the set of clips to determine whether the media presentation was eventually watched.

The preview clip(s) provided to any one of devices 205*a*-*e* can be based on the clip in the set of clips associated with the highest probability of a viewer device eventually watching all episodes of the media presentation.

In some implementations, such analysis of different preview clip sequences are used as inputs to a machine learning algorithm, such as, for example, neural networks, for modifying the criteria for identification, curation, and/or personalization of preview clips to maximize a particular objective, such as completion of the entire media presentation. In some implementations, preview clip personalization logic 255 may include a recommender that uses preview clip metadata, user preferences, and device information to rank and/or select a preview clip to provide to a user.

Figure 3:
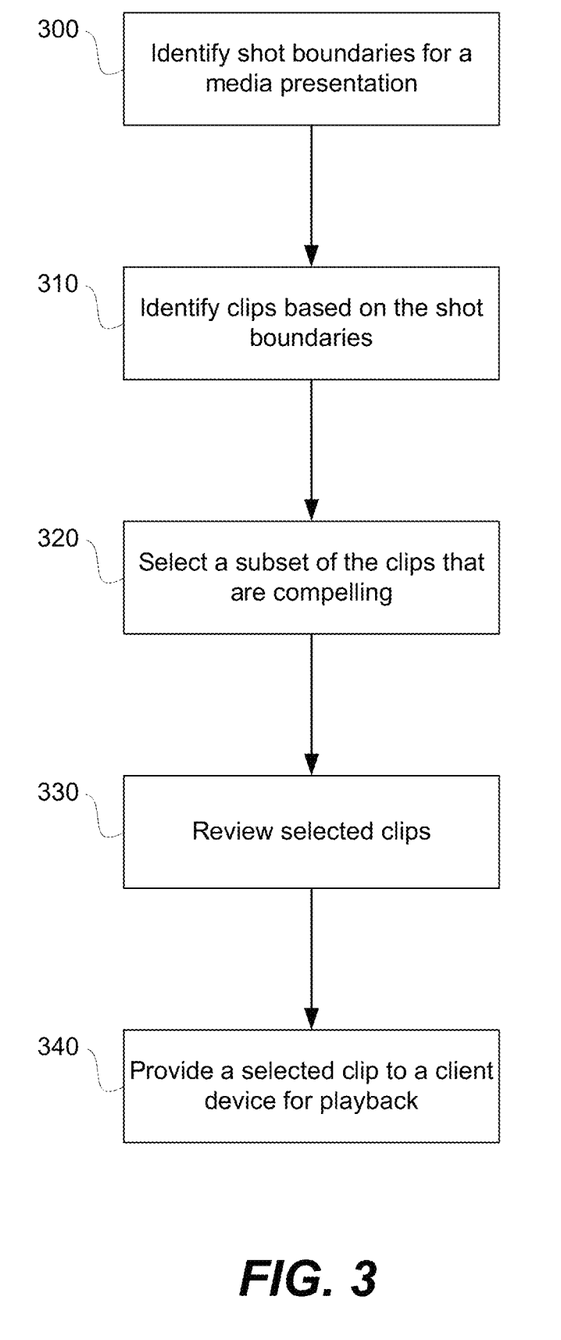
FIG. 3 presents a flowchart illustrating operations of examples of implementations as described herein.

A specific implementation in which one or more previews are generated for a media presentation will now be described with reference to the computing environment of FIG. 2 and the flow diagrams of FIGS. 3, 4, and 5. Starting in step 300, shot boundaries for the media presentation are identified. As mentioned above, a shot is a sequence of video frames depicting visually similar content. Shot boundaries correspond to time stamps within a media presentation at which adjacent frames are visually distinct, e.g., representing a cut to a different shot. Consecutive frames within a shot typically share many visual features, while consecutive frames across two different shots are often dramatically different. A shot boundary may be inferred based on this difference between two consecutive frames. The entire media presentation may be processed to determine such shot boundaries.

For example, a media presentation that is about 45 minutes long might have about several hundred shots, with corresponding shot boundaries between each shot.

In step 310 a plurality of clips may be identified based on the shot boundaries. Identifying clips based on shot boundaries is advantageous because starting or stopping a clip in the middle of a shot has a higher chance of the clip starting or ending in the middle of dialogue or an action, which can create a jarring and unpleasant experience for a user. Clips that start or end on a shot boundary are more likely to include complete dialogue or actions, which is more compelling for a viewer deciding whether to watch a media presentation.

In some implementations, the clips have a predetermined nominal length, e.g., about 30 seconds, about 45 seconds, about 60 seconds, about 90 seconds, or about 120 seconds. In some implementations, the clips may start or end on a shot boundary. In some implementations, the clips may start and end on a shot boundary. Particularly in the case of the latter type of implementation, it is typically not possible to have clips of uniform length while still starting and ending on a shot boundary. In such implementations, the start of a clip may be selected based on a shot boundary, and the end of the clip is selected to be the shot boundary closest to the desired nominal length. For example, if the desired clip length is 45 seconds, the start of the clip may be at one shot boundary, and the end of the clip being selected to be a later shot boundary closest to 45 seconds. Thus, if there are shot boundaries 44 seconds and 47 seconds after the first shot boundary, the clip may be constrained to 44 seconds so that it ends at the corresponding shot boundary. In some implementations, there may be additional rules regarding clips having a minimum or maximum length, such that the selected shot boundary may not be the closest shot boundary (for example, if the clip must have a minimum length of 45 seconds, in the above example the clip would instead end at the shot boundary 47 seconds after the first shot boundary).

In some implementations the clips may start from each shot boundary in a media presentation. In such implementations the clips may overlap such that a particular shot is included in multiple clips. While the average duration of a shot typically varies based on film editing techniques, an average shot duration will often be shorter than the desired clip length. Thus, identifying clips based on shot boundaries may result in overlapping clips.

In some implementations, clips may start from the end of the prior clip. In such implementations the clips would not overlap. In some implementations the clips may be identified such that there is a minimum separation between clips, e.g., between about 30-50 shots between clips. Identifying clips with a minimum separation of shots may be used to ensure that any clip that may be later selected as a compelling clip will be diverse from any other clip that could be selected.

In step 320 a subset of the clips is selected based on metrics that correspond with compelling scenes. Clips corresponding to compelling scenes may be identified based on the extent to which faces of characters are shown and/or the loudness of the clip. Methods for selecting a subset of clips according to these criteria are described in reference to FIGS. 4 and 5. In some implementations, compelling clips may also be identified based on loudness as described in reference to FIG. 6.

In step 330 the selected clips are reviewed. In some implementations, review may include human operators reviewing the selected clips, while in other implementations the review may be automated. Selected clips may be reviewed to ensure, for example, that the clip has a minimum length, or that the clip is of sufficient quality, e.g., it has no flickering, blurriness, lip-sync errors, graininess, or watermarks. The clips may also be reviewed for having a natural beginning and ending, e.g., not starting or stopping in the middle of someone speaking. In some implementations the selected clips may also be reviewed for graphic content or cultural sensitivities, such as violent or sexual content. In some implementations step 330 may also include associating various metadata with the selected clips. For example, the clips may be tagged with which actors/actresses are in the clip, or that the clip is a character-themed clip. Such metadata may include actor profiles, critical commentary, user feedback, narrative descriptions, trivia, importance scores, association factor with a particular plot arc, and other information related to portions of the media presentation, such as a scene within an episode.

In step 340 one or more of the selected clips is provided to a client device for playback. When a client device is browsing options for media playback, using for example a service like Amazon Prime Video®, the client device may send requests to a media server for preview clips of the various media presentations available. Personalization logic employing a personalization model may receive the request, along with user preferences or other characteristics associated with the user and/or client device, to determine which of the selected clips to provide. User preferences may include celebrities, themes, moods, and genres. In some implementations the personalization model may receive contextual information associated with the client device, for example device type, placement, time of day, media player, etc.

The personalization model may be a recommender that determines, based on the information received from the client device and metadata associated with the selected clips, to provide one or more of the selected clips. For example, if user preferences associated with the device indicate the user prefers intense action scenes over dialogue, then a clip identified and selected based on loudness may be provided instead of or in addition to a character-themed clip identified and selected based on average face area.

In some implementations, the clip provided to the client device might also be based on a playback history associated with the client device. For example, if a user has watched the first three episodes of a series, the clip provided to the client device may be from episode 4 to provide the most relevant preview.

In some implementations, the personalization model may receive feedback to improve its recommendations. For example, the percent of users that selected a media presentation for playback after viewing a clip may be used to determine which of the selected clips is the better for a particular user.

Figure 4:
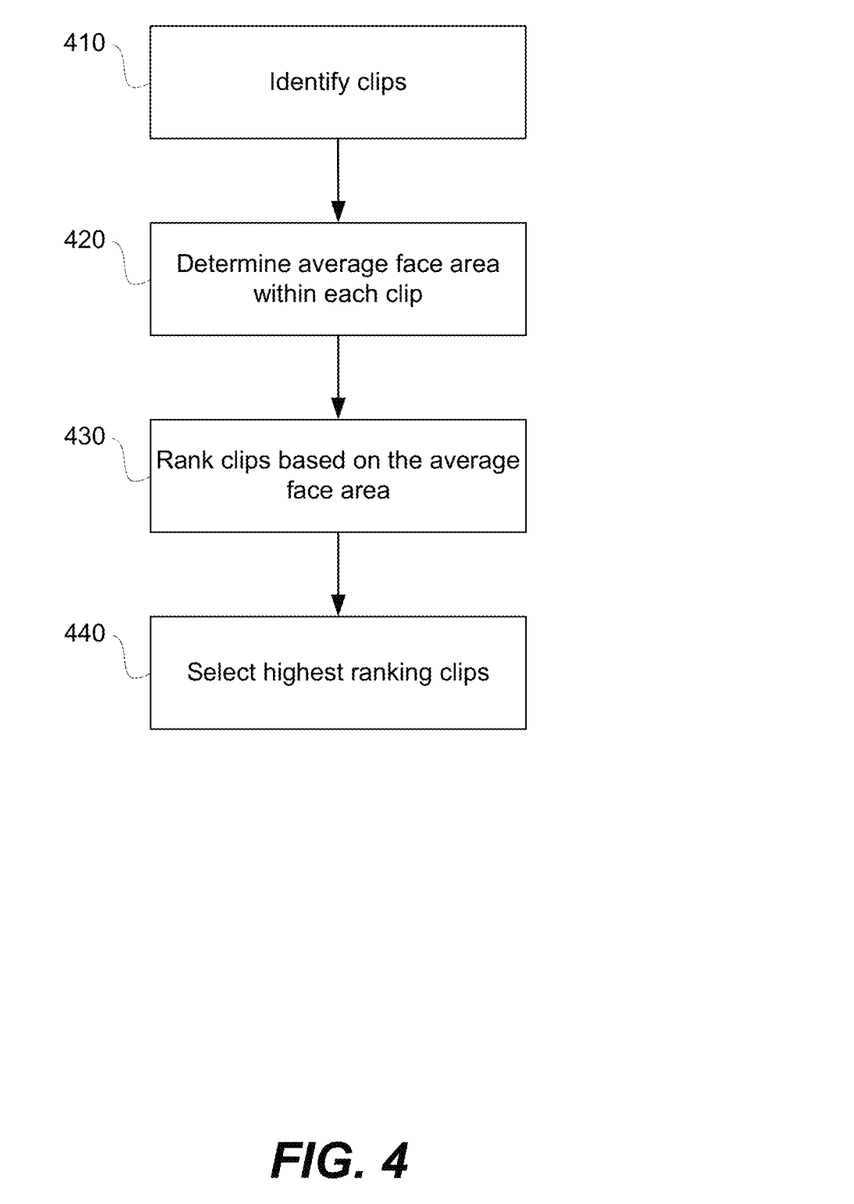
FIGS. 4, 5, and 6 present flowcharts illustrating operations for selecting compelling clips as described herein.
Figure 5:
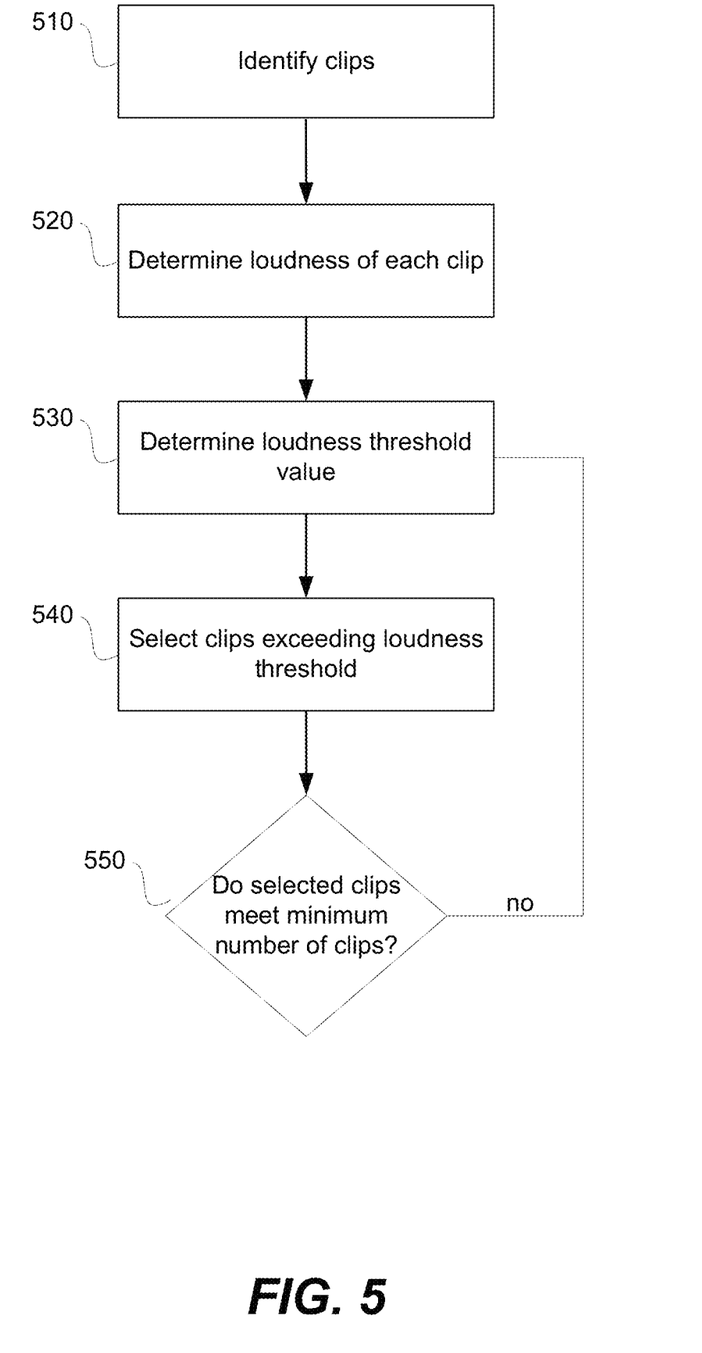

FIGS. 4 and 5 present flow diagrams for selecting a subset of clips that are compelling as described in step 320 above. FIG. 4 provides a flowchart for selecting clips based on the extent to which human faces are represented in the clip. Clips with a large average face area may be desirable, as these clips are more likely to feature close-up views of main characters that attract a user's attention. This may be advantageous over relying on face area alone, as a clip may feature a large number of faces, and thus have a large face area. However, in such a crowded scene most of the faces will not correspond to main characters, and even if any of the main characters are included in the scene, they will not be prominently represented. Selecting clips based solely on the number of faces depicted may be similarly flawed. As users are more likely to select a show based on its main characters rather than other characters, average face area presents a useful tool to automatically identify clips that feature characters in which a user is more likely to be interested.

In step 410, clips of a media presentation are identified. In some implementations, the clips are identified based on shot boundaries as discussed in reference to FIG. 3. In some implementations, the clips may have been previously identified.

In step 420 the representation of human faces in the content is determined for each clip. This may be determined by analyzing individual frames within each clip to determine the total number of faces and some measure of the total face area within each frame. In some implementations, the total face area for a given frame may be determined by bounding a rectangle around each detected face and measuring the area of the rectangle(s). The total face area for a frame may be divided by the total number of faces in the frame to determine an average face area for the frame. The average face area for a clip may then be determined based on the average face area for frames within the clip.

In some implementations every frame in the clip may be analyzed, while in other embodiments fewer than all of the frames of the clip may be analyzed, e.g., every other frame, every ten frames, one frame per second, etc. In some implementations, only I-frames are analyzed. I-frames may be decoded without reference to any other frame. Thus, analyzing only I-frames would allow for analysis of less than all frames without having to decode any frames that would not be analyzed. In implementations where less than all frames are analyzed, the average face area for a clip may be adjusted to compensate for the unanalyzed frames, e.g., by weighting the average face area for the clip or interpolating the average face area for unanalyzed frames.

Because the extent to which human faces are represented may be determined on a frame-by-frame basis, in some implementations, the average face area may be determined for individual frames of a media presentation prior to identifying clips. Regardless of when these measures of face area are determined or how many frames are used, the corresponding measure for each clip may be determined by combining the measures for the frames of that clip.

In step 430 the clips are ranked based on the extent to which human faces are represented in each clip. In some implementations, this may be based on some combination of the average face area in each frame of the clip for which that value was determined. In some implementations, this may be a summation of the average face area in each frame, an average of the average face area in each frame across the clip, or some other operation. In some implementations, clips may be additionally ranked based on having a number of consecutive shots having a high average face area.

In step 440 clips are selected based on the ranking. In some implementations, a predetermined number of clips are selected, for example the top 5 or 10 clips. In some implementations the highest ranking clips are selected. In some implementations, clips may be additionally selected to avoid redundancy resulting from the overlap of clips. As noted above, some shots may be included in multiple clips. If a continuous sequence of shots of a media presentation has a high average face area, each clip that includes that sequence of shots will be highly ranked. Because it is desirable to have a diverse set of clips for curation, personalization, and/or presentation, it is desirable to avoid having the selected clips contain overlapping shots of the media presentation.

To address this issue, in some implementations, clips are selected based on both rank and the proximity of shots between clips. In such implementations, clips are selected to ensure each of the selected clips is non-overlapping and separated from any of the other selected clips. This is accomplished by ensuring that there is a minimum separation (e.g., some number of shots or duration of content) between each of the shots in a highly ranked clip and any shot within any other clip. For example, if the highest ranked clip includes shots 200-230, and the minimum separation is 30 shots, then none of the other selected clips may include any of shots 170-260. In some implementations the minimum separation may vary considerably, e.g., as few as 10 or as many as 50 shots. It should be noted that this may result in selecting clips that are not otherwise highly ranked relative to the highest ranked clips in the entire set of clips. However, this also results in the selected clips having little or no overlap; a desirable result in that a more diverse set of clips better supports subsequent personalization.

The result of FIG. 4 is a set of clips featuring close-up views of characters that likely correspond to compelling scenes. Returning to FIG. 3, the selected clips are further reviewed, e.g., for quality control and metadata tagging. Clips selected in accordance with the process of FIG. 4 may be tagged as character-themed clips. In step 340 one or more of the selected clips is provided to a client device for playback based on preferences associated with the client device. As discussed above, a personalization engine may use a machine learning model to select clips, including clips selected in accordance with FIGS. 4 and 5, to provide to a client device.

FIG. 5 presents a flow diagram illustrating a particular implementation in which clips are selected based on the loudness of the corresponding audio. Louder clips often correspond with "high intensity" scenes that may be engaging for a viewer. As the loudness of a media presentation may vary between media presentations, in some implementations, clips are selected based on a threshold loudness value that is determined for and unique to each media presentation. This is advantageous over relying on a universal loudness threshold, which may not work for all media presentations due to the differences in corresponding audio.

In step 510 clips of a media presentation are identified. In some implementations, the clips are identified based on shot boundaries as discussed in reference to FIG. 3. In some implementations, the identified clips are the same clips identified in step 410 of FIG. 4, such that the same set of clips is used for identifying and selecting character-themed and loudness-based clips.

In step 520 the loudness of the audio associated with each clip is determined. Loudness may be determined based on the loudness values for each of multiple, consecutive portions of a clip, e.g., each second or each shot. Loudness may be represented as a 1-dimensional loudness signal of the audio component of the media presentation with respect to time, e.g., Loudness Full Units Scale or Root Mean Square. In some implementations the loudness signal may be filtered to smooth the signal using, for example a median filter.

In step 530 a loudness threshold value is determined. In some implementations the threshold value is based on the maximum value of the loudness signal (which may be a filtered signal) and a desired number of clips to be selected. For example, if 10 clips are to be selected based on loudness, the threshold value may be adjusted to ensure that at least 10 clips qualify. The threshold value may be set relative to the maximum loudness value so as to appropriately scale the threshold value relative to the overall loudness of the particular media presentation. In some implementations, the threshold value may be set to a proportion or percentage of the maximum value, e.g., 95%, 90%, 85%, etc.

In step 540 clips are selected based on the loudness of each clip and the loudness threshold. In some implementations, the clips may be ranked based on the total loudness of each clip and selected according to the ranking. In other implementations, clips may be selected based on a minimum consecutive number of shots or time within each clip exceeding a threshold value of loudness. For example, a clip might be selected only if it has at least 2 to 5 consecutive shots for which the corresponding measures of loudness exceed the threshold value.

In step 550 the number of selected clips is checked to determine if a minimum number of clips has been selected. If the number of selected clips is less than the minimum number, steps 530-550 are repeated after adjusting the loudness threshold value. For example, if ten clips are desired to be selected having at least 5 consecutive shots above the loudness threshold value, the threshold value may be initially set to 95% of the maximum loudness value. If, upon analyzing the clips, it is determined that only 3 clips have 5 consecutive shots above the loudness threshold value, the loudness threshold value may be decreased and the clips re-analyzed. In some implementations, the loudness threshold value is decreased according to a set value, for example 5% of the maximum loudness, such that the next loudness threshold value would be 90%. The clips may then be re-analyzed to determine if at least ten clips have at least 5 consecutive shots above the new loudness threshold value, with the adjustment repeated as necessary to select the desired number of clips. The desired number of clips may vary from as few as 2 to as many as 20 clips.

In addition, or as an alternative, the number of consecutive shots for which the loudness of a qualifying clip exceeds the threshold may also be varied to achieve the desired number of clips. For example, if dropping the threshold is not sufficient to reach the desired number of clips, the required number of consecutive shots might be reduced (e.g., from 5 to 4).

In some implementations, clips may also be selected based on proximity to each other, similar to step 440 of FIG. 4. For example, each of the ten clips may be required to satisfy the additional constraint of ensuring that there is a minimum separation (e.g., some number of shots or duration of content) between each of the shots in a particular clip and each of the shots in any other selected clip. In such implementations, the loudness threshold value or number of consecutive shots may have to be further lowered to facilitate meeting this additional constraint.

The result of FIG. 5 is a set of clips having loudness profiles likely corresponding to compelling scenes. Returning to FIG. 3, the selected clips are further reviewed, e.g., for quality control and metadata tagging. Clips selected in accordance with the process of FIG. 5 may be tagged as loudness-based clips. In step 340 one or more of the selected clips is provided to a client device for playback based on preferences associated with the client device. As discussed above, a personalization engine may use a machine learning model to select clips, including clips selected in accordance with FIG. 5, to provide to a client device.

Figure 6:
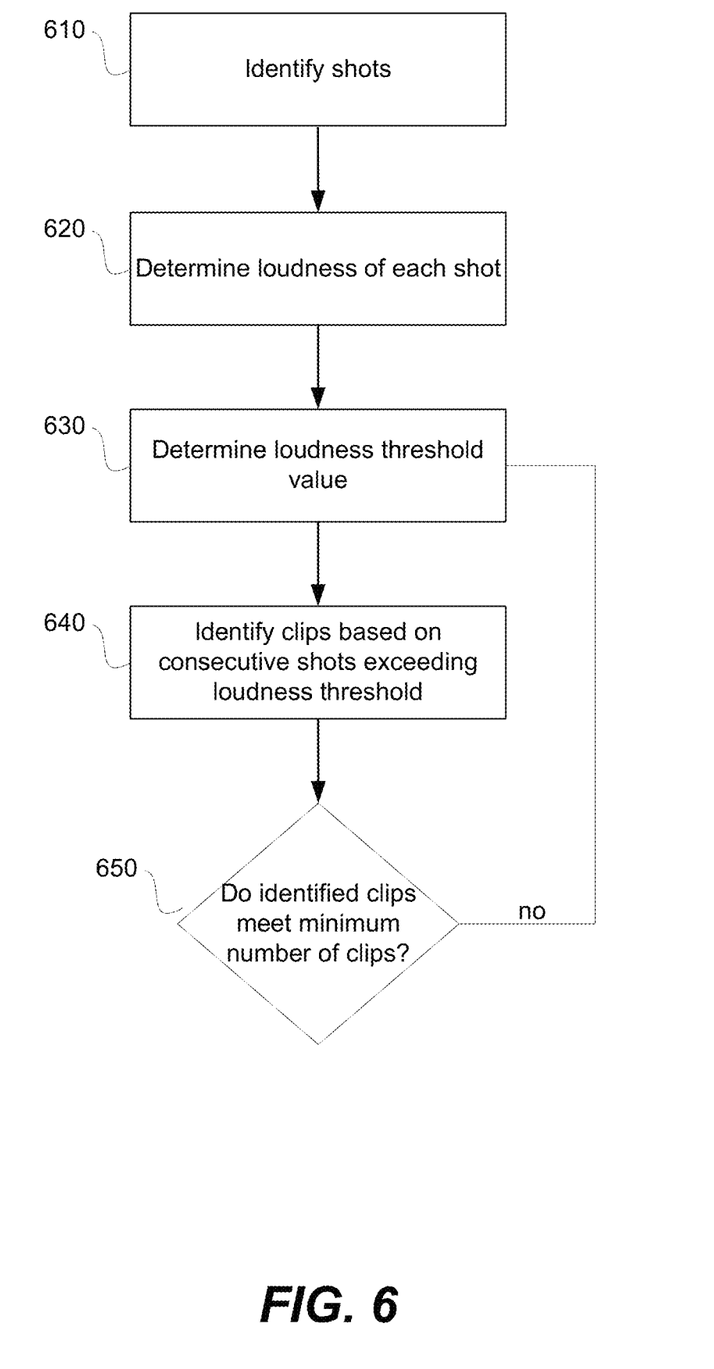

FIG. 6 presents a flow diagram illustrating another particular implementation in which clips are identified based on the loudness of the corresponding audio. The process of FIG. 6 may be used in addition to or as an alternative to the process of FIG. 5 to identify clips that are compelling based on loudness. FIG. 6 relates to FIG. 3 as an alternative to steps 310 and 320. That is, rather than identifying candidate clips and then selecting compelling clips from among the candidate clips, the implementation illustrated in FIG. 6 identifies as a compelling clip any sufficiently long sequence of shots for which the loudness is sufficiently high.

In step 610 shots of a media presentation are identified. In some implementations, the shots are identified based on shot boundaries as discussed in reference to FIG. 3 and step 300. In some implementations, the identified shots may have shot boundaries that are similar to the shot boundaries of clips identified in step 410 of FIG. 4 or 510 of FIG. 5.

In step 620 the loudness of the audio associated with each shot is determined. Loudness may be determined based on the loudness values for each of multiple, consecutive portions of a clip, e.g., each second. Loudness may be represented as a 1-dimensional loudness signal of the audio component of the media presentation with respect to time, e.g., Loudness Full Units Scale or Root Mean Square. In some implementations the loudness signal may be filtered to smooth the signal using, for example a median filter.

In step 630 a loudness threshold value is determined. In some implementations the threshold value is based on the maximum value of the loudness signal (which may be a filtered signal) and a desired number of clips to be selected. In some implementations step 630 may be performed in the same manner as step 530 as describe above.

In step 640 clips are identified based on the loudness of some number of consecutive shots, the loudness threshold, and a desired clip length. The loudness of each shot is compared against the loudness threshold, and if the loudness of the shot exceeds the loudness threshold, the length of the current sequence of consecutive shots exceeding the threshold is compared to a desired clip length. If the length of the sequence of shots exceeds or is sufficiently close to the desired clip length, the sequence of shots is identified as a compelling clip. Alternatively, if the sequence of shots is not long enough, another shot may be compared to the loudness threshold and added to the sequence of shots until either a shot is encountered that fails to have a loudness above the loudness threshold, or the length of the sequence of shots exceeds or is sufficiently close to (e.g., within one shot duration of) the desired clip length.

If the next shot does not have a loudness exceeding the loudness threshold, the sequence of shots is not identified as a clip, and a new sequence may be analyzed beginning with the next shot that has a loudness that exceeds the loudness threshold. In this manner, a clip is identified in which each shot in the clip has a loudness above the loudness threshold. In some implementations, once a compelling clip is identified, the shot immediately following the clip is analyzed to determine if the loudness exceeds the threshold loudness, and may be used to start a new sequence of shots. In other implementations, a number of shots may be skipped before starting a new sequence, e.g., between about 30 to 50 shots. This may be desirable to reduce overlap and ensure identified clips are from diverse parts of a media presentation. This process may repeat until the entire media presentation has been analyzed to identify clips that only include shots that have a loudness exceeding the loudness threshold and the minimum desired length.

In step 650 the number of identified clips is checked to determine if a minimum number of clips has been identified. If the number of identified clips is less than the minimum number, steps 630-650 are repeated after adjusting the loudness threshold value. For example, if ten clips are desired to be selected all having consecutive shots above the loudness threshold value, the threshold value may be initially set to 95% of the maximum loudness value. If, upon analyzing the clips using this initial threshold value, it is determined that only 3 clips were identified, the loudness threshold value may be decreased and the shots re-analyzed with the lower threshold. In some implementations, the loudness threshold value is decreased according to a set value, for example 5% of the maximum loudness, such that the next loudness threshold value would be 90%. The shots may then be re-analyzed to determine if at least ten clips having consecutive shots above the new loudness threshold value can be identified, with the adjustment repeated as necessary to select the desired number of clips. The desired number of clips may vary, e.g., from as few as 2 to as many as 20 clips.

In addition, or as an alternative, the length of the desired clip may be adjusted. For example, if dropping the threshold is not sufficient to reach the desired number of clips, the required length of the clip may be reduced (e.g., from 45 seconds to 30 seconds).

Implementations are also contemplated in which not every shot in a sequence must exceed the threshold in order for the sequence to be identified as a clip. For example, if a shot is encountered in a current sequence that does not exceed the threshold but the next shot does, the process may continue without beginning a new sequence. Other variations on this theme that fall within the scope of this disclosure will be understood by those of skill in the art.

The result of the implementation illustrated in FIG. 6 is a set of clips having loudness profiles likely corresponding to compelling scenes. Returning to FIG. 3, the identified clips are further reviewed, e.g., for quality control and metadata tagging. Clips selected in accordance with the process of FIG. 6 may be tagged as loudness-based clips. In step 340 one or more of the selected clips is provided to a client device for playback based on preferences associated with the client device. As discussed above, a personalization engine may use a machine learning model to select clips, including clips selected in accordance with FIG. 6, to provide to a client device.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A method, comprising:
   identifying a plurality of shot boundaries of a media presentation, each shot boundary corresponding to a visual transition in the media presentation;
   identifying a first plurality of clips based on the shot boundaries, each clip including a contiguous range of content of the media presentation beginning and ending at corresponding shot boundaries, each clip including a plurality of shots, each shot being defined by a corresponding pair of shot boundaries;
   determining a first score for each clip of the first plurality of clips, the first score representing an average face area for each frame in the clip;
   ranking the first plurality of clips based on the first scores;
   selecting a subset of the first plurality of clips based on the highest-ranking clips;
   determining a second score for each shot of the plurality of shots, the second score representing a measure of loudness of audio content associated with the shot;
   identifying a threshold value;
   identifying a second plurality of clips each of which includes a consecutive number of the shots for which the second score exceeds the threshold value; and
   providing one or more of the clips from either the subset of the first plurality of clips or the second plurality of clips to a first client device.

2. The method of claim 1, further comprising removing a first clip from the subset of the first plurality of clips based on graphic content within the first clip or a quality measure associated with the first clip.

3. The method of claim 1, further comprising adjusting the threshold value to achieve a predetermined number of clips in the second plurality of clips.

4. The method of claim 1, wherein selecting the subset of the first plurality of clips includes excluding a first clip from inclusion in the subset of the first plurality of clips that includes overlapping content with a second clip included in the subset of the first plurality of clips.

5. A method, comprising:
   identifying a plurality of shot boundaries of a media presentation, each shot boundary corresponding to a visual transition in the media presentation, wherein the media presentation includes a plurality of shots, each shot being defined by a corresponding pair of the shot boundaries;
   identifying a first plurality of clips based on the shot boundaries, each clip including a contiguous range of content of the media presentation beginning and ending at corresponding shot boundaries;
   determining a first score for each clip of the first plurality of clips, the first score representing an extent to which human faces are represented in the clip;
   selecting a subset of the first plurality of clips based on the first scores;
   determining a second score for each shot, the second score representing a measure of loudness of audio content associated with the shot;
   identifying a second plurality of clips based on the second scores; and
   providing one or more clips from the subset of the first plurality of clips, the second plurality of clips, or any combination thereof to a first client device.

6. The method of claim 5, wherein the first score for each clip of the first plurality of clips is based on an area occupied by the human faces in one or more frames of the clip and a number of the human faces represented in the one or more frames of the clip.

7. The method of claim 5, wherein determining the second score for each shot includes determining the measure of loudness based on a filtered signal representing the audio content associated with the shot.

8. The method of claim 5, wherein identifying the second plurality of clips includes identifying a first clip for which the second score for each of a consecutive number of the shots in the first clip exceeds a threshold value.

9. The method of claim 8, further comprising adjusting the threshold value to achieve a predetermined number of clips in the second plurality of clips.

10. The method of claim 5, further comprising removing a first clip from the subset of the first plurality of clips or the second plurality of clips based on graphic content within the first clip or a quality measure associated with the first clip.

11. The method of claim 5, wherein selecting the subset of the first plurality of clips includes excluding a first clip from inclusion in the subset of the first plurality of clips that includes overlapping content with a second clip included in the subset of the first plurality of clips.

12. The method of claim 11, wherein each clip includes a sequence of the shots, and wherein at least one of the shots included in the first clip is within a minimum number of shots of one of the shots included in the second clip, and wherein the second clip has a higher first score or a higher second score than the first clip.

13. A system, comprising memory and one or more processors configured to:
   identify a plurality of shot boundaries of a media presentation, each shot boundary corresponding to a visual transition in the media presentation, wherein the media presentation includes a plurality of shots, each shot being defined by a corresponding pair of the shot boundaries;
   identify a first plurality of clips based on the shot boundaries, each clip including a contiguous range of content of the media presentation beginning and ending at corresponding shot boundaries;
   determine a first score for each clip of the first plurality of clips, the first score representing an extent to which human faces are represented in the clip;
   select a subset of the first plurality of clips based on the first scores;
   determine a second score for each shot, the second score representing a measure of loudness of audio content associated with the shot;
   identify a second plurality of clips based on the second scores; and
   provide one or more clips from the subset of the first plurality of clips, the second plurality of clips, or any combination thereof to a first client device.

14. The system of claim 13, wherein the first score for each clip of the first plurality of clips is based on an area occupied by the human faces in one or more frames of the clip and a number of the human faces represented in the one or more frames of the clip.

15. The system of claim 13, wherein the one or more processors are configured to determine the second score for each shot by determining the measure of loudness based on a filtered signal representing the audio content associated with the shot.

16. The system of claim 13, wherein the one or more processors are configured to identify the second plurality of clips by identifying a first clip for which the second score for each of a consecutive number of the shots in the first clip exceeds a threshold value.

17. The system of claim 16, wherein the one or more processors are further configured to adjust the threshold value to achieve a predetermined number of clips in the second plurality of clips.

18. The system of claim 13, wherein the one or more processors are further configured to remove a first clip from the subset of the first plurality of clips or the second plurality of clips based on graphic content within the first clip or a quality measure associated with the first clip.

19. The system of claim 13, wherein the one or more processors are configured to select the subset of the first plurality of clips by excluding a first clip from inclusion in the subset of the first plurality of clips that includes overlapping content with a second clip included in the subset of the first plurality of clips.

20. The system of claim 19, wherein each clip includes a sequence of the shots, and wherein at least one of the shots included in the first clip is within a minimum number of shots of one of the shots included in the second clip, and wherein the second clip has a higher first score or a higher second score than the first clip.

* * * * *